(12) United States Patent
Winokur

(10) Patent No.: US 10,379,958 B2
(45) Date of Patent: Aug. 13, 2019

(54) FAST ARCHIVING FOR DATABASE SYSTEMS

(71) Applicant: AXXANA (ISRAEL) LTD., Tel Aviv (IL)

(72) Inventor: Alex Winokur, Ramat Gan (IL)

(73) Assignee: AXXANA (ISRAEL) LTD., Tel Aviv (IL)

( * ) Notice: Subject to any disclaimer, the term of this patent is extended or adjusted under 35 U.S.C. 154(b) by 515 days.

(21) Appl. No.: 15/169,811

(22) Filed: Jun. 1, 2016

(65) Prior Publication Data

US 2016/0357639 A1    Dec. 8, 2016

Related U.S. Application Data

(60) Provisional application No. 62/170,197, filed on Jun. 3, 2015.

(51) Int. Cl.
*G06F 11/14* (2006.01)
*G06F 16/21* (2019.01)
*H04L 29/08* (2006.01)

(52) U.S. Cl.
CPC ...... *G06F 11/1446* (2013.01); *G06F 11/1456* (2013.01); *G06F 11/1471* (2013.01); *G06F 16/21* (2019.01); *H04L 67/1097* (2013.01)

(58) Field of Classification Search
CPC ........... G06F 17/30575; G06F 11/1471; G06F 11/1469; G06F 17/30227; G06F 11/1458; G06F 11/2023; G06F 11/1456
See application file for complete search history.

(56) References Cited

U.S. PATENT DOCUMENTS

| 3,140,847 A | 7/1964 | Ames |
| 5,027,104 A | 6/1991 | Reid |
| 5,546,533 A | 8/1996 | Koyama |
| 5,594,900 A | 1/1997 | Cohn et al. |
| 5,623,597 A | 4/1997 | Kikinis |
| 5,680,579 A | 10/1997 | Young et al. |

(Continued)

FOREIGN PATENT DOCUMENTS

| EP | 0420425 A2 | 4/1991 |
| GB | 2273180 A | 6/1994 |

(Continued)

OTHER PUBLICATIONS

Nadporojski, G., "Review of GSM-telephone Benefon Twin+", published on http://www.ixbt.com, 6 pages, Jan. 9, 2001.

(Continued)

*Primary Examiner* — Jay A Morrison
*Assistant Examiner* — Ken Hoang
(74) *Attorney, Agent, or Firm* — Kligler & Associates

(57) ABSTRACT

Methods, storage facilities and computer software products implement embodiments of the present invention that include mapping, by a storage system including one or more storage devices, a set of storage blocks on a given storage device to a redo log file configured to store transactions performed by a transaction processing system. An archiving condition is specified, and upon the transaction processing system completing a given transaction a copy of the given transaction is stored to the redo log file. Upon the archiving condition being met, the storage system can remap the set of storage blocks to an archive log file.

23 Claims, 7 Drawing Sheets

(56) References Cited

U.S. PATENT DOCUMENTS

| | | |
|---|---|---|
| 5,724,501 A | 3/1998 | Dewey et al. |
| 5,799,141 A | 8/1998 | Galipeau et al. |
| 5,841,768 A | 11/1998 | Ozluturk et al. |
| 5,889,935 A | 3/1999 | Ofek et al. |
| 6,105,078 A | 8/2000 | Crockett et al. |
| 6,144,999 A | 11/2000 | Khalidi et al. |
| 6,158,833 A | 12/2000 | Engler |
| 6,173,377 B1 | 1/2001 | Yanai et al. |
| 6,226,651 B1 | 5/2001 | Masuda et al. |
| 6,260,125 B1 | 7/2001 | McDowell et al. |
| 6,298,290 B1 | 10/2001 | Abe et al. |
| 6,324,654 B1 | 11/2001 | Wahl et al. |
| 6,389,552 B1 | 5/2002 | Hamilton et al. |
| 6,400,730 B1 | 6/2002 | Latif et al. |
| 6,574,538 B2 | 6/2003 | Sasaki |
| 6,580,450 B1 | 6/2003 | Kersting et al. |
| 6,658,590 B1 | 12/2003 | Sicola et al. |
| 6,684,306 B1 | 1/2004 | Nagasawa et al. |
| 6,816,480 B1 | 11/2004 | Monroe et al. |
| 6,842,825 B2 | 1/2005 | Geiner et al. |
| 6,859,865 B2 | 2/2005 | De Margerie |
| 6,954,875 B2 | 10/2005 | Liu |
| 6,976,186 B1 | 12/2005 | Gardner |
| 7,020,743 B2 | 3/2006 | Lee et al. |
| 7,065,589 B2 | 6/2006 | Yamagami |
| 7,111,189 B1 | 9/2006 | Sicola et al. |
| 7,114,094 B2 | 9/2006 | Soejima |
| 7,120,834 B1 | 10/2006 | Bishara |
| 7,148,802 B2 | 12/2006 | Abbroscato et al. |
| 7,185,228 B2 | 2/2007 | Achiwa |
| 7,188,292 B2 | 3/2007 | Cordina et al. |
| 7,293,154 B1* | 11/2007 | Karr .............. G06F 11/2082 711/202 |
| 7,302,506 B2 | 11/2007 | Harima et al. |
| 7,383,405 B2 | 6/2008 | Vega et al. |
| 7,386,376 B2 | 6/2008 | Basir et al. |
| 7,451,355 B1 | 11/2008 | Coatney et al. |
| 7,478,266 B2 | 1/2009 | Gatto et al. |
| 7,487,311 B2 | 2/2009 | Stroberger et al. |
| 7,548,560 B1 | 6/2009 | Dropps et al. |
| 7,577,724 B1 | 8/2009 | Jalagam et al. |
| 7,577,807 B2 | 8/2009 | Rowan et al. |
| 7,657,578 B1 | 2/2010 | Karr et al. |
| 7,668,177 B1 | 2/2010 | Trapp et al. |
| 7,707,453 B2 | 4/2010 | Winokur |
| 7,707,460 B2 | 4/2010 | Hyde, II et al. |
| 7,797,582 B1 | 9/2010 | Stager et al. |
| 7,984,327 B2 | 7/2011 | Winokur |
| 7,996,709 B2 | 8/2011 | Winokur |
| 8,015,436 B2 | 9/2011 | Winokur |
| 8,289,694 B2 | 10/2012 | Winokur |
| 8,762,341 B1* | 6/2014 | Mahajan .............. G06F 11/1448 707/640 |
| 8,914,666 B2 | 12/2014 | Winokur |
| 9,021,124 B2 | 4/2015 | Winokur |
| 9,195,397 B2 | 11/2015 | Winokur et al. |
| 2001/0044795 A1* | 11/2001 | Cohen .............. G06F 17/30699 |
| 2001/0047412 A1 | 11/2001 | Weinman |
| 2002/0103816 A1* | 8/2002 | Ganesh .............. G06F 11/2066 |
| 2002/0162112 A1 | 10/2002 | Javed |
| 2002/0176417 A1 | 11/2002 | Wu et al. |
| 2002/0188392 A1 | 12/2002 | Breed et al. |
| 2003/0014523 A1 | 1/2003 | Teloh et al. |
| 2003/0037034 A1* | 2/2003 | Daniels .............. G06Q 10/087 |
| 2003/0093541 A1 | 5/2003 | Lolayekar et al. |
| 2003/0097607 A1 | 5/2003 | Bessire |
| 2003/0115324 A1 | 6/2003 | Blumenau et al. |
| 2003/0204597 A1 | 10/2003 | Arakawa et al. |
| 2004/0012316 A1 | 1/2004 | Davis |
| 2004/0030837 A1 | 2/2004 | Geiner et al. |
| 2004/0044649 A1 | 3/2004 | Yamato et al. |
| 2004/0044865 A1 | 3/2004 | Sicola et al. |
| 2004/0059844 A1 | 3/2004 | Jones et al. |
| 2004/0064639 A1 | 4/2004 | Sicola et al. |
| 2004/0073831 A1 | 4/2004 | Yanai et al. |
| 2004/0078637 A1 | 4/2004 | Fellin et al. |
| 2004/0083245 A1 | 4/2004 | Beeler |
| 2004/0153717 A1 | 8/2004 | Duncan |
| 2004/0193658 A1 | 9/2004 | Kawamura et al. |
| 2004/0193802 A1 | 9/2004 | Meiri et al. |
| 2004/0230352 A1 | 11/2004 | Monroe |
| 2004/0260873 A1 | 12/2004 | Watanabe |
| 2004/0267516 A1 | 12/2004 | Jibbe et al. |
| 2005/0005001 A1 | 1/2005 | Hara et al. |
| 2005/0015657 A1 | 1/2005 | Sugiura et al. |
| 2005/0027892 A1 | 2/2005 | McCabe et al. |
| 2005/0055357 A1* | 3/2005 | Campbell .............. G06F 11/2071 707/615 |
| 2005/0243609 A1 | 11/2005 | Yang et al. |
| 2005/0257015 A1 | 11/2005 | Hiraiwa et al. |
| 2005/0262170 A1* | 11/2005 | Girkar .............. G06F 17/30575 |
| 2005/0273565 A1 | 12/2005 | Hirakawa et al. |
| 2005/0280421 A1 | 12/2005 | Yomoda et al. |
| 2006/0025897 A1 | 2/2006 | Shostak et al. |
| 2006/0031468 A1 | 2/2006 | Atluri et al. |
| 2006/0051157 A1 | 3/2006 | Bornstein et al. |
| 2006/0072580 A1 | 4/2006 | Dropps et al. |
| 2006/0075148 A1 | 4/2006 | Osaki |
| 2006/0274755 A1 | 12/2006 | Brewer et al. |
| 2006/0284214 A1 | 12/2006 | Chen |
| 2007/0025175 A1 | 2/2007 | Liu et al. |
| 2007/0061379 A1 | 3/2007 | Wong et al. |
| 2007/0079088 A1 | 4/2007 | Deguchi et al. |
| 2007/0083657 A1 | 4/2007 | Blumenau |
| 2007/0094467 A1 | 4/2007 | Yamasaki |
| 2007/0124789 A1 | 5/2007 | Sachson et al. |
| 2007/0180239 A1* | 8/2007 | Fujibayashi ........ G06F 11/1076 713/165 |
| 2007/0198613 A1 | 8/2007 | Prahlad et al. |
| 2007/0226438 A1 | 9/2007 | Erofeev |
| 2007/0266197 A1 | 11/2007 | Neyama et al. |
| 2007/0271313 A1 | 11/2007 | Mizuno et al. |
| 2008/0001128 A1 | 1/2008 | Goldberg |
| 2008/0004904 A1 | 1/2008 | Tran |
| 2008/0061963 A1 | 3/2008 | Schnitz et al. |
| 2008/0104443 A1 | 5/2008 | Akutsu et al. |
| 2008/0177964 A1 | 7/2008 | Takahashi et al. |
| 2008/0184068 A1* | 7/2008 | Mogi .................. G06F 11/1435 714/15 |
| 2008/0201390 A1 | 8/2008 | Anguelov |
| 2008/0263363 A1 | 10/2008 | Jueneman et al. |
| 2008/0297346 A1 | 12/2008 | Brackman et al. |
| 2009/0007192 A1 | 1/2009 | Singh |
| 2009/0313503 A1 | 12/2009 | Atluri et al. |
| 2010/0121824 A1 | 5/2010 | Kawamura et al. |
| 2011/0026527 A1 | 2/2011 | Shao et al. |
| 2011/0131186 A1 | 6/2011 | Whisenant |
| 2012/0124311 A1 | 5/2012 | Winokur |
| 2013/0016721 A1 | 1/2013 | Bill et al. |
| 2016/0147614 A1* | 5/2016 | Mittal .................. G06F 11/1469 707/615 |

FOREIGN PATENT DOCUMENTS

| | | |
|---|---|---|
| JP | H05-233413 A | 9/1993 |
| JP | 2004164094 A | 6/2004 |
| JP | 200571068 A | 3/2005 |
| RU | 2128854 C1 | 4/1999 |
| RU | 2221177 C2 | 1/2004 |
| WO | 01/97030 A1 | 12/2001 |
| WO | 2005022292 A2 | 3/2005 |
| WO | 2008049703 A2 | 5/2008 |
| WO | 2014170810 A2 | 10/2014 |
| WO | 2015056169 A1 | 10/2014 |

OTHER PUBLICATIONS

Goldfire Ltd., "Technology and Solutions Developed for Our Clients", 4 pages, Brussels, Belgium, 2009.

FireTrust, "FireTrust Technology", 4 pages, Brussels, Belgium, 2009.

EMC Corporation, "EMC SRDF Family: High-Performance remote replication for business continuity", 2 pages, USA (Sep. 6, 2006).

(56) References Cited

OTHER PUBLICATIONS

IBM Corporation, "Storage Solutions: Data Encryption within the Drive Itself", 2 pages, USA (Sep. 6, 2006).
"Flexible Min-K: Product Information", 2 pages, Thermal Ceramics Inc, Jan. 2008.
ANSI/INCITS standard 269-1996, "Information Technology—SCSI-3 Fibre Channel Protocol (FCP)", American National Standards Institute (ANSI) and the International Committee for Information Technology Standards (INCITS), 77 pages, Apr. 8, 1996.
OracleTM—Database Backup and Recovery User's Guide, 11g Release 2 (11.2) , E10642-06, 604 pages, May 2015.
OracleTM—Concepts, 11g Release 2 (11.2) , E25789-01, 460 pages, Sep. 2011.
U.S. Appl. No. 15/261,952 Office Action dated Jul. 28, 2017.
IBM., "DFSMS Advanced Copy Services", IBM document SC35-0428-15, Sixteenth Edition, 731 pages, Feb. 2009.
EMC® Symmetrix® Remote Data Facility (SRDF®),Product Guide,Revision 04, 178 pages, Mar. 2014.
Oracle Data Guard 11g, "Data Protection and Availability for Oracle Database"—An Oracle Technical White Paper, 22 pages ,Oct. 2011.
Veritas™ Volume Replicator Option by Symantec , "A Guide to Understanding Volume Replicator"—A technical overview of replication capabilities included in Veritas Storage Foundation™ and the Volume Replicator Option, 28 pages, 2006.

* cited by examiner

FAST ARCHIVING FOR DATABASE SYSTEMS

CROSS-REFERENCE TO RELATED APPLICATIONS

This application claims the benefit of U.S. Provisional Patent Application 62/170,197 filed on Jun. 3, 2015, whose disclosure is incorporated herein by reference.

FIELD OF THE INVENTION

The present invention relates generally to storage systems, and specifically to performing fast archive operations on transaction processing systems that use redo logs.

BACKGROUND

In addition to managing files storing tables and indexes, database management systems (DBMSs) typically manage redo log files and archive log files that can be used to restore a database in the event of a system crash or failure. When a DBMS updates a table in the database, the DBMS stores a copy of the transaction to an entry in a redo log file. In the event of a hardware and/or a software failure, the transactions stored in the redo log file can be used to restore the database to its state prior to the failure.

The description above is presented as a general overview of related art in this field and should not be construed as an admission that any of the information it contains constitutes prior art against the present patent application.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY

There is provided, in accordance with an embodiment of the present invention a method, including mapping, by a storage system including one or more storage devices, a set of storage blocks on a given storage device to a redo log file configured to store transactions performed by a transaction processing system, specifying an archiving condition, upon the transaction processing system completing a given transaction, storing a copy of the given transaction to the redo log file, and remapping, by the storage system, the set of storage blocks to an archive log file upon the archiving condition being met.

In one embodiment, the storage system may execute a block manager that is configured to map a logical volume to a given storage device. In some embodiments, remapping the set of storage blocks may include renaming, by a host computer coupled to the storage system executing the block manager, the redo log file to the archive log file.

In another embodiment, the storage system may execute a file-level manager, and wherein the file-level manager remaps the set of storage blocks by renaming the redo log file to the archive log file. In additional embodiments, mapping the set of storage blocks to the redo log file may include receiving, from the transaction processing system, a set of file blocks for the redo log file, and mapping the set of file blocks to the set of volume blocks.

In further embodiments, transaction processing system may include a database management system. In supplemental embodiments, the redo log file includes a first redo log file, wherein the set of storage blocks includes a first set of storage blocks, and upon remapping the multiple storage blocks to the archive log file, the method includes mapping a second set of storage blocks to a second redo log file, and storing, to the second redo log file, copies of additional transactions completed by the transaction processing system.

In some embodiments, the method includes detecting that the archiving condition is met by detecting one or more of: a specific time interval, a specific number of transactions in the redo log file, overwriting the redo log file, and a specific amount of storage space used by the redo log file. In additional embodiments, the redo log file includes a set of storage blocks having respective physical locations on the given storage device, and wherein upon remapping the set of storage blocks to the archive log file, the archive log file includes the set of storage blocks at the same respective physical locations on the given storage device.

In supplemental embodiments, the storage system includes a first storage system, wherein the redo log file includes a first redo log file, wherein the multiple storage blocks include a first set of storage blocks, and the method includes mirroring the first redo file to a second set of storage blocks on a second storage system, and wherein remapping the set of storage blocks to the archive log file includes remapping the second set of the storage blocks to the archive log file.

In further embodiment, the given storage device includes a volume storing the multiple storage blocks, and wherein remapping the multiple storage blocks to the archive log file includes generating a snapshot of the volume. In some embodiments, the snapshot includes a redirect-on-write snapshot.

There is also provided, in accordance with an embodiment of the present invention a storage system, including one or more storage devices, each of the storage devices including a plurality of storage blocks, and a storage processor configured to map a set of the storage blocks on a given storage device to a redo log file configured to store transactions performed by a transaction processing system, to specify an archiving condition, upon the transaction processing system completing a given transaction, to store a copy of the given transaction to the redo log file, and to remap the set of the storage blocks to an archive log file upon the archiving condition being met.

There is further provided, in accordance with an embodiment of the present invention a computer software product, the product including a non-transitory computer-readable medium, in which program instructions are stored, which instructions, when read by a computer, cause the computer to map, by a storage system including one or more storage devices, a set of storage blocks on a given storage device to a redo log file configured to store transactions performed by a transaction processing system, to specify an archiving condition, upon the transaction processing system completing a given transaction, to store a copy of the given transaction to the redo log file, and to remap, by the storage system, the set of storage blocks to an archive log file upon the archiving condition being met.

There is additionally provided, in accordance with an embodiment of the present invention a method, receiving, by a block-based storage system from a host computer, a host mapping for a file including a set of file blocks, mapping, by the block-based storage system, the set of file blocks to a first set of storage blocks, and remapping, by the block-based storage system, the set of file blocks to a second set of storage blocks, wherein the first set of storage blocks and the second set of storage blocks are mutually exclusive.

In some embodiments, the method includes mapping, by the block-based storage system, the first set of storage blocks to an archive file. In additional embodiments, the method includes receiving, from the host computer prior to the remapping, a request to retrieve data from the file, retrieving the requested data from the second set of storage blocks, and conveying the retrieved data to the host computer.

In further embodiments, the method includes receiving, from a host computer prior to the remapping, a request to write data to a given file block, and writing the data to a given storage block mapped in the first set. In supplemental embodiments, the method includes receiving, from a host computer subsequent to the remapping, a request to write data to a given file block, and writing the data to a given storage block in the second set.

There is also provided, in accordance with an embodiment of the present invention a storage system, including one or more storage devices, each of the storage devices including a plurality of storage blocks, and a processor configured to receive, from a host computer, a host mapping for a file including a set of file blocks, to map a set of file blocks to a first set of the storage blocks, and to remap the set of file blocks to a second set of the storage blocks, wherein the first set of the storage blocks and the second set of the storage blocks are mutually exclusive.

There is additionally provided, in accordance with an embodiment of the present invention a computer software product, the product including a non-transitory computer-readable medium, in which program instructions are stored, which instructions, when read by a computer, cause the computer to receive, by a block-based storage system from a host computer, a host mapping for a file including a set of file blocks, to map, by the block-based storage system the set of file blocks to a first set of storage blocks, and to remap, by the block-based storage system, the set of file blocks to a second set of storage blocks, wherein the first set of storage blocks and the second set of storage blocks are mutually exclusive.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
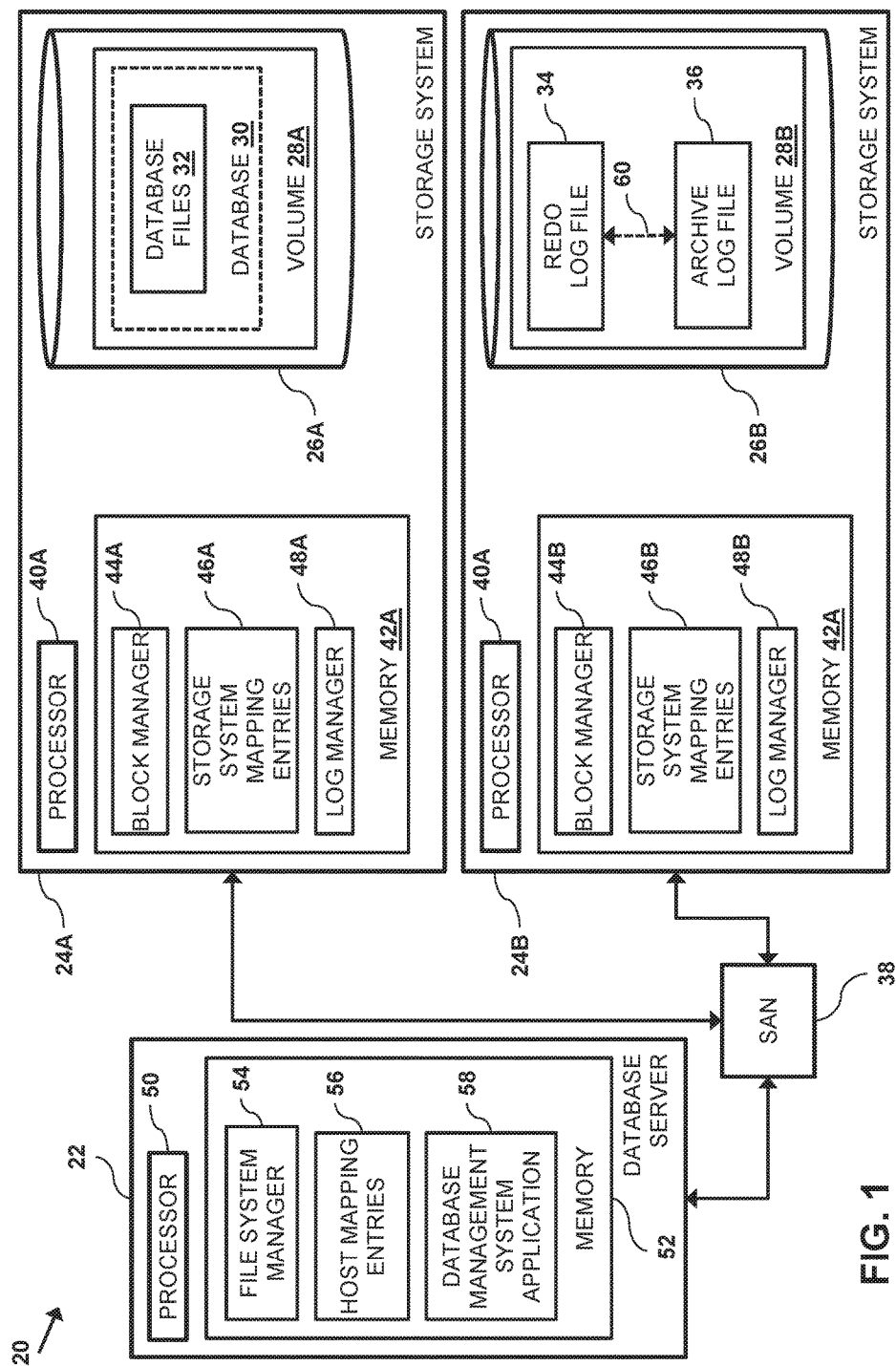
FIG. 1 is a block diagram that schematically illustrates a storage facility comprising a database management system and configured to perform fast archive operations by remapping data stored in a redo log file to an archive log file, in accordance with a first embodiment of the present invention.

Redo log files are typically configured to store a limited number of transactions, and in some configurations, a database management system (DBMS) may maintain a fixed number of redo log files. For example, a DMBS may configure three redo log files that can each store thirty minutes of transactions. In this configuration, the redo log entries are cyclically written between each of the redo log files so that when all the redo log files fill up, the next log entry is written back to the "oldest" redo log file (i.e., the oldest redo log file is rewritten).

In some instances, a much larger number of log entries (i.e., than those stored in the redo log files) may be required to restore a database in the event of a system failure. In these instances, transactions in the oldest redo log file can be copied to an archive log file before rewriting the oldest redo log file with new transactions. Unlike redo log files which are automatically rewritten, archive log files typically need to be explicitly deleted. Therefore, the number of archive log files can dynamically change depending on different circumstances. For example, a DBMS may be configured to delete the archive log file(s) of a database upon completing a backup of the database.

A storage facility comprising a database server may be configured to store both archive log files and redo log files on a single storage system. In this configuration, if the average write throughput to redo log files is T, then the database server and storage system need to support an additional read throughput of T and an additional write throughput of T in order to copy the redo log files to archive log files (i.e., reading the redo log files and writing them to archive log files). However, if the database server stores redo log files on a first storage system and stores archive log files on a second storage system, then the first storage system needs to support an additional read throughput of T, and the second storage system needs to support an additional write throughput of T.

These storage system throughputs may be significant, since the redo log file write throughput may be in accordance with the write throughput required by update operations performed by the database server. Additionally, while the write operations to the redo and archive log files are typically purely sequential and can therefore yield very good storage performance (if correctly configured), the read operations typically require additional seek operations that can upset the sequential nature of the write operations, thereby potentially impacting the performance of the storage systems.

Embodiments of the present invention provide methods and systems for quickly generating an archive log file from a redo log file. As described hereinbelow, a set of storage blocks on a storage device are initially mapped to a redo log that is configured to store transactions performed by a transaction processing system such as a database server, and an archiving condition is specified. Upon the transaction processing system completing a given transaction, a copy of the given transaction is stored to the redo log, and upon the archiving condition being met, the set of storage blocks (i.e., the storage blocks storing the redo log data) are remapped to an archive log file.

In embodiments of the present invention, the initial mapping defines a first association between the set of storage blocks with the redo log file, and the remapping deletes the first association and defines a second association between the same set of storage blocks and the archive log file. In other words, the remapping operation does not move or copy the transactions stored in the set of storage blocks to a second set of storage blocks.

By remapping the storage blocks of redo log files to archive log files, storage systems implementing embodiments of the present invention can significantly improve their performance when creating and managing the redo and the archive log files. For example, in configurations where log entries are cyclically written between redo log files, storage system performance can be improved as a result of each new redo log file comprising "new" (i.e., previously unmapped) space on the storage system, which can be more efficient that overwriting the least recent redo log file.

In configurations where the redo log files and the archive log files are stored on a single storage system, the storage system has all the data for internally creating the archive log files from the redo files. Thus, by writing the redo log files to the storage system only once, the archive log files can be internally created, and the storage system does not need to support any additional write throughput for creating the archive log files.

In configurations where the redo and the archive log files are stored on different storage systems, efficiencies can be gained by mirroring the redo log files to the storage system storing the archive log files, and remapping the storage blocks storing a given mirrored redo log file to a new archive log file. While this configuration requires additional T write throughput on the storage system storing the archive log files (i.e., during the mirroring process), it still saves T read throughput.

In operation, archive log files are typically deleted by the storage system when explicitly requested to do so by the database server. For example, if the archive log files are generated from redo log files that have a write throughput of T, embodiments described herein can use the following methods to improve system performance while maintaining the redo and the archive log files:

If both file types reside on the same storage system, then the storage system and the database server typically do not require any additional average write and read throughput to generate the archive log files.

If the redo log files reside on a first storage system and the archive log files reside on a second storage system, then the second storage system requires T additional average write throughput but will not require any additional read throughput.

In both of the configurations described supra, the read operations are eliminated when creating the archive log files. Therefore, performance can be increased by keeping all write operations purely sequential with no intermediate seeks required by these read operations.

SYSTEM DESCRIPTION

FIG. 1 is a block diagram that schematically illustrates a storage facility 20 comprising a database server 22 and storage systems 24, in accordance with a first embodiment of the present invention. In embodiments described herein, storage systems 24 and their respective components are differentiated by appending a letter to the identifying numeral, so that the storage systems comprise storage systems 24A and 24B.

Storage systems 24 comprise one or more storage devices 26 that store logical volumes 28. Examples of storage devices 26 include, but are not limited to, hard disk drives and solid-state disk drives. Each of the storage devices comprises multiple storage blocks (not shown in FIG. 1) having a fixed size (e.g., 512 bytes).

In the configuration shown in FIG. 1, storage device 26A comprises a volume 28A that stores a database 30 comprising database files 32 (also referred to herein as files 32), and storage device 26B comprises a volume 28B that stores a redo log file 34 and an archive log file 36. In other words, in the example shown in FIG. 1, the redo and the archive log files are stored to a single given (i.e., the same) storage system 24.

Database server 22 and storage systems 24 communicate over a data network such as a storage area network (SAN) 38. In an alternative configuration, database server 22 and storage systems 24 can communicate via a network file system (NFS) over a wide area network (WAN). While embodiments herein describe database server 22 generating redo log files 34, any transaction processing system that generates the redo log files is considered to be within the spirit and scope of the present invention.

In the configuration shown in FIG. 1 (and in the configuration shown in FIG. 8 described hereinbelow), storage systems 24 are configured as block-level storage systems. In addition to one or more storage devices 26, each storage system comprises a storage processor 40, and a storage memory 42 that stores a block manager 44, storage system mapping entries 46, and a log manager 48. Each volume 28 comprises a plurality volume blocks (not shown in FIG. 1), and block manager 44 is configured to map a given logical volume 28 to a given storage device 26 by mapping a set of the storage blocks to a set of the volume blocks. Storage system mapping entries 46, and log manager 48 are described hereinbelow.

Log manager 48 comprises a software application that uses embodiments described herein to remap redo log file 34 to archive log file 36, as indicated by an arrow 60. In embodiments of the present invention, log manager 48 remaps redo log file 34 to archive log file 36 independently of database server 22.

Database server 22 comprises a database processor 50 and a database memory 52 that stores a file system manager 54, host mapping entries 56 and a database management system application that manages and processes queries for database 30. File system manager 54 maps the logical volumes 28 to the files (e.g., database files 32 and redo log file 34) stored on the volumes. In embodiments of the present invention, archive log files 36 are typically not generated explicitly by the database management system application 58. Each of the files comprises a set of file blocks (not shown in FIG. 1), and as explained in the description referencing FIG. 3 hereinbelow, host mapping entries 56 store mappings of the file blocks to their respective volume blocks.

In addition to the host mappings that map the file blocks to the volume blocks, embodiments of the present invention store storage system mapping entries 46 that store mappings of the volume blocks to the storage blocks. As described hereinbelow, log manager 48 initially defines a given system mapping entry 46 for redo log file 34, and can then remap the redo log file to archive log file 36 by modifying the given system mapping entry Examples of storage system mapping entries 46 are described in the description referencing FIGS. 5, 6 and 7 hereinbelow.

Figure 2:
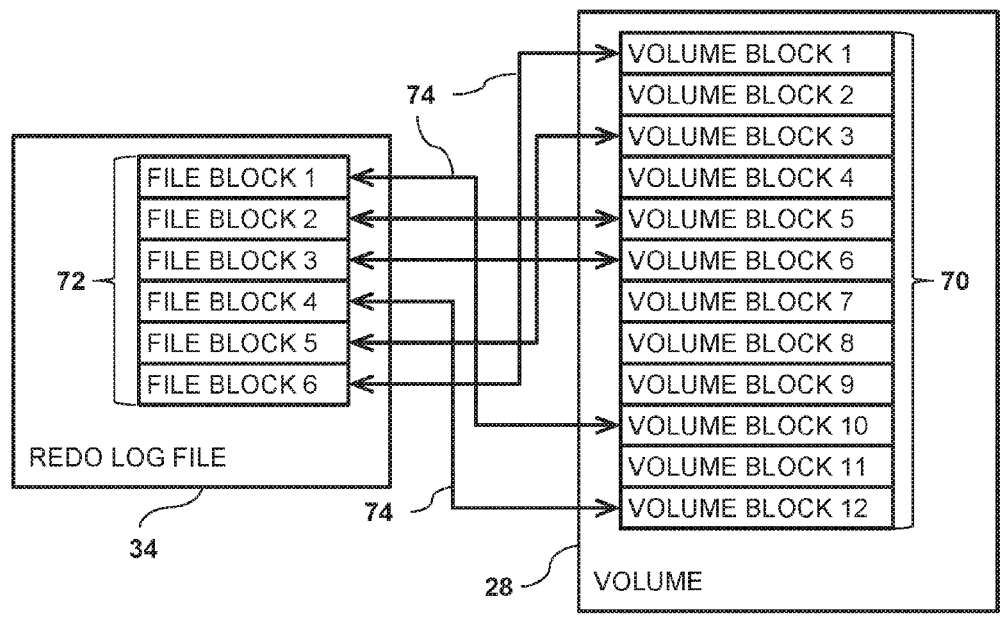
FIG. 2 is a block diagram that schematically illustrates a file mapping of the redo log file to a logical volume, in accordance with an embodiment of the present invention.

FIG. 2 is a block diagram that schematically illustrates a mapping of redo log file 34 to logical volume 28, in accordance with an embodiment of the present invention. Logical volume 28 comprises a set of volume blocks 70 that correspond to physical storage blocks on a given storage device 26. In the example shown in FIG. 2, redo log file 34 comprises file blocks 72 that have a one-to-one correspondence with the volume blocks in the set, as indicated by arrows 74.

Figure 3:
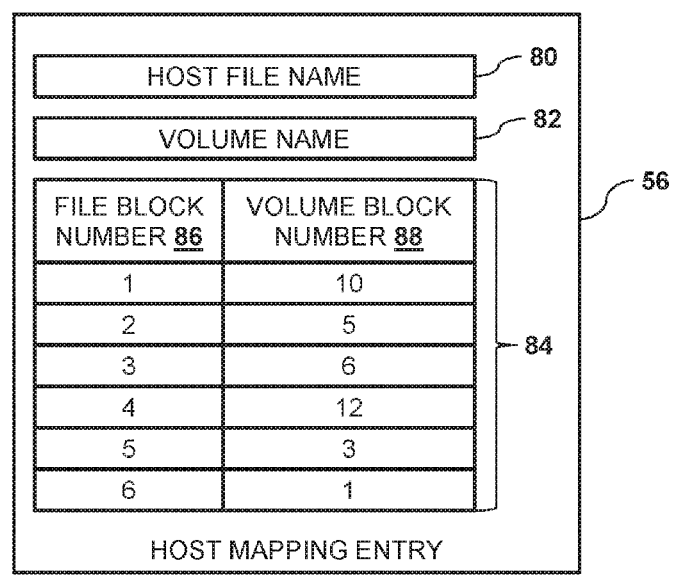
FIG. 3 is a block diagram of a host mapping entry showing the file mapping of the redo log file to the logical volume, in accordance with an embodiment of the present invention.

FIG. 3 is a block diagram of a given host mapping entry 56 showing the host file mapping of redo log file 34 to logical volume 28, in accordance with an embodiment of the present invention. Each host mapping entry 56 comprises a host file name 80 indicating a given file (e.g., redo log file 34), a volume name 82 of a given volume 28 storing the given file, and mapping pairs 84. Each mapping pair 84 comprises a tuple of given file block number 86 that corresponds to a given volume block number 88. Therefore, each file block number 86 references a given file block 72 in redo log file 34, and each volume block number 88 references a given volume block 70 in volume 28.

Using file system manager 54, processor 50 can access data on storage devices 26 via a given (unique) host file name 80 and a byte offset within a given file 32. The byte offset is translated into a given a file block number indicating a given file block 72 and an offset within the given file block. Using the host mapping entry for the given file, file system manager 54 translates the file block number to a given volume name 82 and a given volume block number 88 indicating a given volume block 70, and log manager 48 can either read data stored at the file block number in a given storage device 26 or write data to the file block number in the given storage device.

Data is typically stored in a given file block 72 at the same offset as in the original file block. For example, using the host mapping entry shown in FIG. 3, if each volume block is 512 bytes, and a request is received to access data at offset 512. If offsets are counted from 0 (i.e. the file blocks store data at offsets 0 to 511), then offset 512 is found at offset 0 in the second file block 72, and the requested data can therefore be found at offset 0 in the fifth volume block 70, as indicated by the second mapping pair 84.

In some embodiments, host mapping entries 56 can be stored in a table that can be queried by processor 50. For example, host mapping entries 56 may be stored in a X$KFFXP allocation table, which is an Extent™ mapping table for the Automatic Storage Management™ (ASM) file system which is produced by Oracle Corporation (Redwood City, Calif.).

For example, a given host mapping entry 56 for redo log file 34 (or any other file stored in storage facility 20) can be abstracted into a file mapping function of the form:

{volume_name, volume_block}=file_map(file_name, file_block)

where volume_name indicates the given volume 28 where the given redo log file resides, volume_block indicates a given volume block 70 within the given volume, file_name indicates the (unique) file name 80 for the given redo log file, and file_block indicates a given file block 72 in the given redo log file.

Note that volume_block is unique for a particular file_name and file_block tuple, since the same volume block 70 cannot belong to two different files 32. Therefore, if a given storage system 24 receives a request for a write operation to a given volume block 70, the given storage system can determine the file name that the given volume block belongs to and determine the file block corresponding to the given volume. For example, based on file mapping function described supra, storage systems 24 can use the following inverted function:

{file_name, file_block}=remap(volume_name, volume_block)

where volume_name and volume_block are input parameters and file_name and file_block are output parameters.

Figure 4:
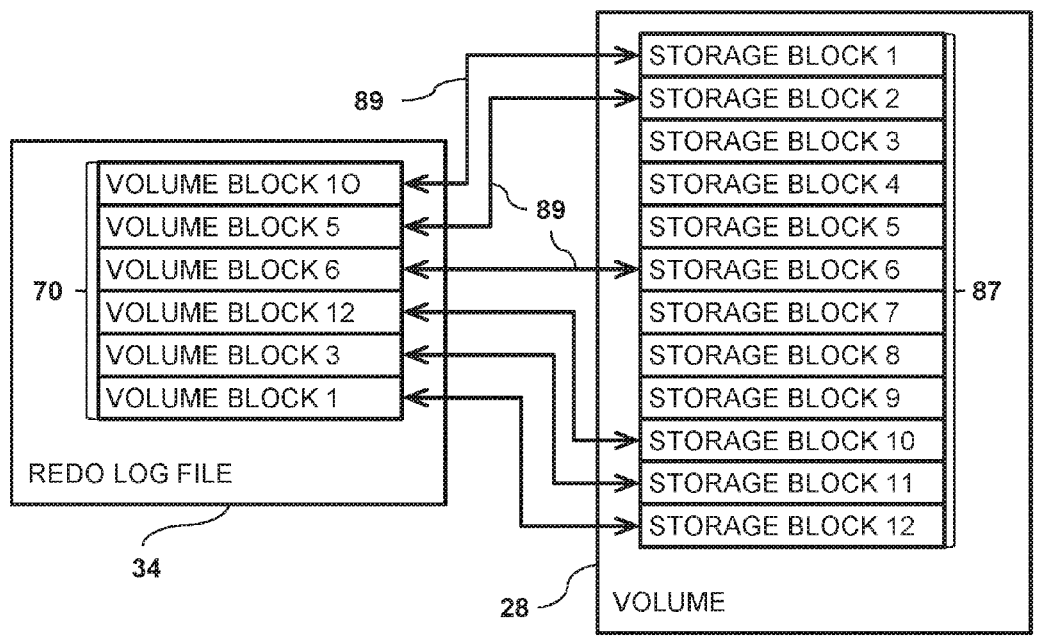
FIG. 4 is a block diagram that schematically illustrates a storage system file mapping of the redo log file to a first set of storage blocks, in accordance with an embodiment of the present invention.

FIG. 4 is a block diagram that schematically illustrates a mapping of volume blocks 70 in redo log file 34 to storage blocks 87 on a given storage device 26, in accordance with an embodiment of the present invention. As described supra, each storage blocks 87 comprises a fixed amount of storage space (e.g., 512 bytes) on a given storage device 26. In the example shown in FIG. 4, redo log file 34 comprises a set of volume blocks 70 that have a one-to-one correspondence with a set of storage blocks 87, as indicated by arrows 89.

Figure 5:
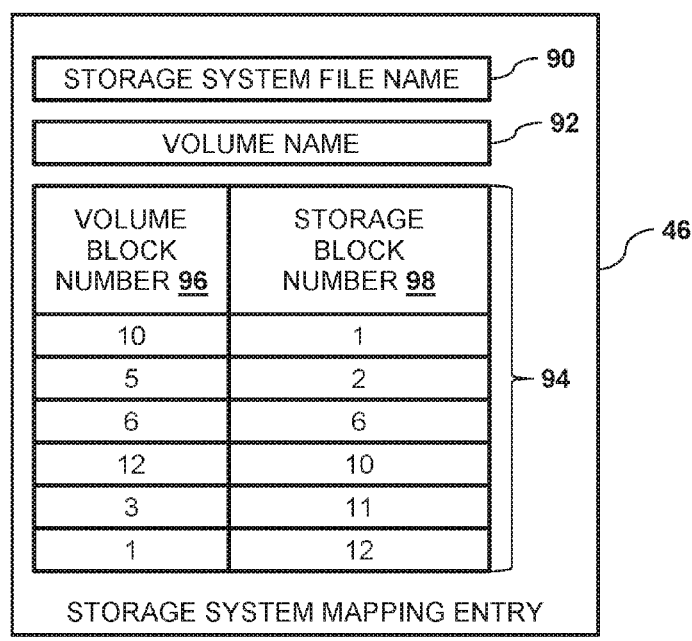
FIG. 5 is a block diagram of a storage system mapping entry showing the mapping of the redo log file to the first set of storage blocks, in accordance with an embodiment of the present invention.

FIG. 5 is a block diagram of a given storage system mapping entry 46 showing the mapping of volume blocks 70 in redo log file 34 to storage blocks 87, in accordance with an embodiment of the present invention. Each storage system mapping entry 46 comprises a storage system file name 90 indicating a given file (e.g., redo log file 34), a volume name of a given volume 28 storing the given file, and mapping pairs 94. Each mapping pair 94 comprises a tuple of a given volume block number 96 that corresponds to a given storage block number 98. Therefore, each volume block number 88 references a given volume block 70 in redo log file 34, and each storage block number 98 references a given storage block 87 on a given storage device 26. These storage system mappings of volume blocks 70 to storage blocks 98 are typically executed by virtualization layer (not shown) executing on storage systems 24 that can map the data in the redo log files to locations assigned by the storage system mappings (i.e., instead of locations assigned by the database server as provided by the host mapping entries). In these configurations, each new redo log file 34 can be stored to a new location (i.e., unused storage blocks 70), while the redo log file in the old location (i.e., a previous version of the redo log file) is remapped to become a given archive log file 36.

As described supra, log manager 48 remaps redo log file 34 to archive log file 36 independently of database server 22. In embodiments of the present invention, a first storage system mapping entry 46 stores the mappings between volume blocks 70 and storage blocks 87 for redo log file 34, and log manager 48 can remap the redo log file to archive log file 36, by editing the first storage system mapping entry. For example, log manager 48 can edit the first storage system mapping entry to perform the remapping.

In embodiments described herein, database server 22 may be configured to reuse redo log file 34 upon "copying" the redo log file to archive log file 36. Using embodiments described hereinbelow, database server 22 can copy redo log file 34 to archive log file 36 by conveying an explicit command to storage system 24 to remap the redo log file to the archive log file. In additional embodiments the storage systems can implicitly copy redo log file 34 to archive log file 36 upon detecting that a given redo log file 34 is about to be overwritten (i.e., due to the cyclical configuration of the redo log files). Upon remapping redo log file 34 to archive log file 36, block manager can retrieve a new set of storage blocks from a pool of available storage blocks (not shown), and create a new storage system mapping entry 46 that maps the volume blocks mapped to the reo log file to the new set of storage blocks.

Figures 6, 7:
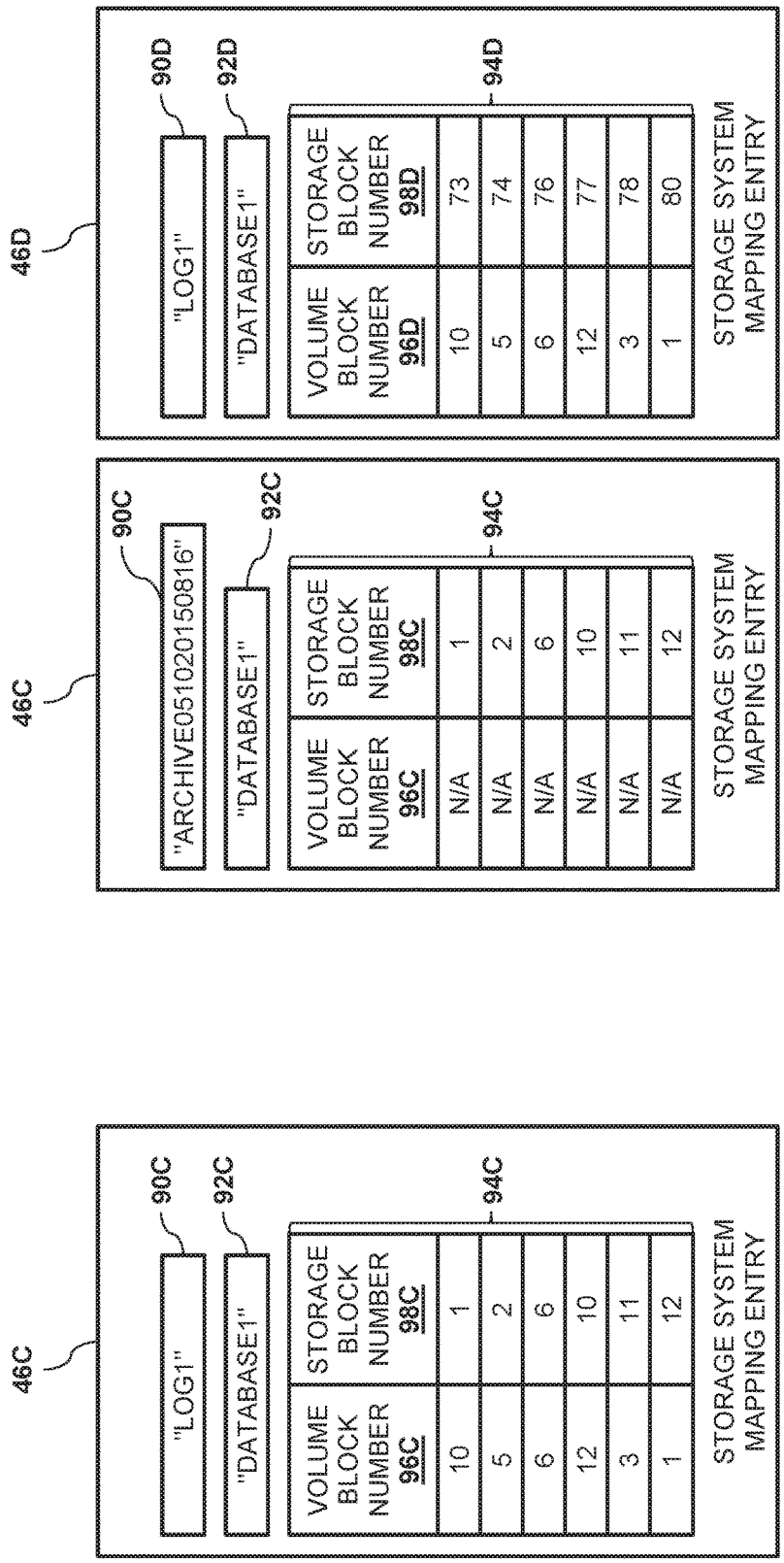
FIG. 6 is a block diagram of a first storage system mapping entry showing the mapping of the redo log file to the first set of storage blocks, in accordance with an embodiment of the present invention.
FIG. 7 is a block diagram of the first storage system mapping entry that is updated to show a mapping of an archive log file to the first set of storage blocks, and a second mapping entry showing a new mapping of the redo log file to a second first set of storage blocks, in accordance with an embodiment of the present invention.

FIG. 6 is a block diagram that shows a first given storage system mapping entry 46 comprising first set of storage block numbers 98 indicating a first set of storage blocks 87 that are initially mapped to redo log file 34, and FIG. 7 is a block diagram that shows, subsequent to remapping the redo log file to the archive log file, the first given storage system mapping entry remapped to archive log file 36, and a second given storage system mapping entry 46 that comprises a second set of storage block numbers 98 indicating a second set of storage blocks 87 mapped to the redo log file, in accordance with an embodiment of the present invention. In FIGS. 6 and 7, storage system mapping entries 46 and their respective data components are differentiated by appending a letter to the identifying numeral, so that the storage system mapping entries comprise storage system mapping entries 46C and 46D.

In the example shown in FIG. 6, storage system mapping entries 46C comprises storage system file name 90C "LOG1", volume name 92C "DATABASE1", and storage system mapping entries 46C comprising mapping pairs 94C that map a first set of storage blocks 87 that are indicated by storage block numbers 98C to a set of volume blocks 70 that are indicated by a volume block numbers 96C.

As described hereinbelow, log manager can use the format mmddyyyyhhmmss when naming archive log file 36, where mm indicates a month, dd indicates a day, yyyy indicates a year, hh indicates an hour, mm indicates minutes and ss indicates seconds. In the example shown in FIG. 7, log manager 48 remaps redo log file 34 to archive log file 36 by changing storage system file name 90C to "ARCH-IVE051020150816". In some embodiments, log manager 48 can clear volume block numbers 96C (e.g., by storing "N/A" volume block numbers 96C) since storage system mapping entry 46C is no longer associated with redo log file 34.

Upon modifying storage system mapping entry 46A to remap redo log file 34 to archive log file 36, log manager 48 can configure the redo log file to store copies of new transactions for database 30 by creating storage system mapping entry 46D. In the example shown in FIG. 7, storage system mapping entry 46D comprises storage system file name 90D "LOG1" (i.e., the name of the redo log file that was remapped to the archive log file), volume name 92D "DATABASE1", and storage system mapping entries 46D comprising mapping pairs 94D that map a second set of storage blocks 87 that are indicated by storage block numbers 98D to a set of volume blocks 70 that are indicated by a volume block numbers 96D. In embodiments of the present invention, volume block numbers 96C are in accordance with volume block numbers 96D, and the first and the second sets of storage blocks are mutually exclusive (i.e., there are no common storage blocks 87 in the first and the second sets of the storage blocks).

When processor 50 initially creates redo log file 34 by creating a given host mapping entry 56, the database processor conveys the given host mapping entry to log manager 48, and the log manager can use data in the given host mapping entry to define a given storage system mapping entry 46 for the redo log file. To convey the given host mapping to log manager 48 in storage system 24, processor 5 can use the following call level interface (CLI) function:

map (file_map)

where file_map is a structure of the form:

```
file_map
{
    file_name        /*The file name
    volume_name      /*The volume on which the file resides
    database_name    /*Name of database to which file belongs
    number_of_map_entries    /*Number of map table rows
    map_entries[number_of_map_entries] /*Map table rows
    {
        file_block
        volume_block
    }
}
``` where database_name is used to associate the given redo log file to a given database 30, and can be used to read the redo or the archive log files for the given database. CLIs can be issued to the storage systems either in-band to a Logical Unit Number (LUN) 0 device, e.g., either using a specially coded computer system configuration item (CSCI) command or using out-of-band communication that exploits the storage facility's network (e.g., Ethernet™) interfaces.

In operation, for each write operation received by storage system 24, log manager 48 can check whether the write is to any of the redo log files to be virtualized. This can be done by checking whether the address of the volume block to be written appears in any given storage system mapping entry 46. If it does appear, then this is a write to the redo log file corresponding to a given host mapping entry 56, and the write has to be directed to a location as maintained by a virtualization layer (not shown) comprising log manager 48. However, if this is not a write to a given redo log file 34, then the write is treated by storage system 24 as any other regular write bypassing the virtualization layer.

Subsequent to checking whether the address of the volume block to be written appears in any given storage system mapping entry 46, log manager 48 checks whether this is a first write to the given redo log file. If this condition is met, then log manager 48 allocates space for the given redo log file and creates a corresponding storage system mapping entry 46 for the given redo log file. These storage system mapping entries 46 created by file log manager 48 can be referred to as "virtual file maps" to distinguish them from the host mapping entries used by the database server. This step is done in order not to overwrite the previous version of this given redo log file.

For each given database 30 in storage facility 20, log manager 48 can maintain a virtual database file map directory of the redo and the archive log files belonging to the given database as shown in the following table:

| data_base_name | | |
|---|---|---|
| file_name | file_type | creation_date |
| Log1 | Redo log | 05/10/2015 08:45:25 |
| Log2 | Redo log | 05/10/2015 08:51:36 |
| Log3 | Redo log | 05/10/2015 08:37:12 |
| Archive05102015081630 | Archive Log | 05/10/2015 08:16:30 |
| Archive05102015081630 | Archive Log | 05/10/2015 08:32:56 |

In the example shown in the table, Log1, Log2 and Log3 comprise the storage system file names for three redo log files 34, and Archive05102015081630 and Archive05102015081630 comprise two archive log files 36. For each of the transaction and the archive log files in the virtual file map directory, there are also the corresponding virtual file maps. The virtual file maps are linked to the corresponding rows in the virtual file map directory tables by the unique file_name field and data_base_name field. Therefore, a given host file name 80 in a given host mapping entry 56 may comprise a virtual file map where virtual_file_map.database_name and virtual_file_map.file are the same for the given host mapping entry.

When log manager 48 creates a new redo log file 34, the log manager can add information such as a file name, a file type and a file creation time to a virtual database file map directory for the corresponding database 30. In addition, log manager 48 changes the file name and the file type of the previous version of the redo log file to represent a "new" archive log file 36. The file name for a given archive log file 36 typically encapsulates the time and date of its creation.

In the example shown in the table, the names of the archive log files are of the form Archive mmddyyyyhhmmss where mm indicates a month, dd indicates a day, yyyy indicates a year, hh indicates an hour, mm indicates minutes and ss indicates seconds. In embodiments of the present invention, log manager 48 can perform read operations for redo log files 34 using the virtualization logic used for the write operations described supra.

When database 30 is initialized, log manager 48 receives file mapping information for each database file 32 and for each of the redo log files using the map CLI, and creates corresponding storage system mapping entries 46. Log manager 48 also sets a variable array current_file_name[ ] to NULL, where current_file_name[database_name] is the file name of the current redo log file 34 for the database. If current_file_name for the database is different than the file name to which the current write is directed, then database management system application 58 starts writing to the next redo log file 34, thus overwriting its previous content. Thus, new space has to be allocated for the next redo log file as described supra.

To process a write operation to block n of volume volume_name is received by log manager 48, the log manager can execute the virtualization algorithm encapsulated by using the following function:

write(n, volume, data)

where n indicates a block number (block address) to be written, volume indicates a given volume 28 to which the block to be written, and data indicates the data to be written. The following is an example of an algorithm that can be used to implement the write function:

```
write(n, volume, data)
{
    If n appears in any of the redo files map tables on
    volume Then
    {
        /*this is a write to some redo file,
        /*determine file name, database name and file
        offset for the block
        {file_name, file_block} = remap(volume, n)
        database_name = database (file_name)
        /*if first write to a new file allocate space for
        the new file
        If current_file_name[database_name] ≠ file_name
        Then
        {
            /*allocate space for the file and create a
            virtual file map for it
            allocate(file_name)
            update virtual database file map directory
            Add entry to virtual database file map
            directory for this file_name
            mark previous version of this file if exists
            as archive
            If there is a previous entry for file_name
            in virtual file map directory then
            {
                rename previous file to represent
                archve log file in the corresponding
                virtual file map and in the
                corresponding entry in virtual file map
                directory.
                change the file_type field to Archve
                log file
            }
            current_file_name[database_name] = file_name
        }
        storage_block = virtual_file_map(file_name,
        file_block)
            write data to storage_block
        }
        else /*not a write to any of the redo logs
            therefore should be natively handles
        {
        Write data to volume at location n
        }
}
```

The write function can also use the following additional functions:

allocate(file_name). This function allocates space for file file_name and constructs a virtual file map for the file. In some embodiments, log manager 48 can use the space of the original redo log as known to the database server for allocation to the virtual files, as this space is otherwise never used.

{file_name, file_block}=remap(volume, n). As described supra, this function returns file_name and file_block that represents file block n on volume 28.

database_name=database(file_name). This function returns the database name of the database to which the redo log file file_name belongs.

storage_block=virtual_file_map (file_name, file_block). This function provides a location of the file block file_block in the file file_name within the virtual allocated space for file_name.

Although the implementation describes reading and writing of a single file block 72, it can be easily extended to reading and writing multiple file blocks 72. In this case each entry in the file mapping consists of a range of file blocks 72.

To process a read operation from the volume block n of the volume volume_name, log manager 48 can execute the virtualization algorithm encapsulated by the function:

read(n, volume, data)

where n indicates a given volume block 70 (i.e., a block address) to be read, volume indicates the volume to which the volume block to be read belongs, and data indicates a buffer to where the data is to be read. The following is an example of an algorithm that can be used to implement the read function:

```
read(n, volume, data)
{
    If n appears in any of the redo files map tables on volume
    Then
    {
        /*this is a read from some redo file,
        /*determine file name, database name and file offset
        for the block
        {file_name, file_block} = remap(volume, n)
        storage_block = virtual_file_map(file_name,
        file_block)
        read data from storage_block
    }
    else
    /*not a write to any of the redo logs therefore should be
    natively handles
    {
        read data from volume at location n
    }
}
```

Archive log files 36 are typically read as in their entirety either when backed up to tape or during a recovery process. There are many possible implementations to perform these read operations. For example, log manager 48 can implement the following CLIs (i.e., functions) below that can be issued by the database server to support reading the archive log files:

get_archive_names(database). This function returns all the file names of the archive log files for a given database 30, and also returns a size (e.g., in file blocks 72) for each of the returned archive log files.

get_archive(database, archive_name, start_block, number_of_blocks). This function reads number_of_blocks number of file blocks 72 starting at the file block start_block for the archive log file archive_name belonging to the database database_name.

These CLIs can be implemented out-of-band over TCP/IP if log manager 48 supports TCP/IP connectivity or in-band imbedded in some special SCSI command.

In some embodiments, a given archive log file 36 can be deleted by the database server by releasing its space to log manager 48, thereby re-clearing its corresponding virtual file map and removing its corresponding entry from the virtual database file map directory. There are many possible implementations for deleting archive log files 36. For example log manager 48 can implement the following CLIs to perform the deletions:

arch_delete(database). This CLI deletes the oldest archive log file 36 for the database database_name.

arch_delete_by_name(database, file_name). This CLI deletes the archive log file file_name for the database database_name.

Another option is to configure log manager 48 to maintain a fixed number of archive log files 36. In this case, log manager will implicitly delete the oldest archive log files 36 whenever the fixed number of the archive log files is exceeded. This can be done using the CLI arch_keep(database, number_of_files) which is a function configured to always keep number_of_files archive log files 36 for the database database_name.

Figure 8:
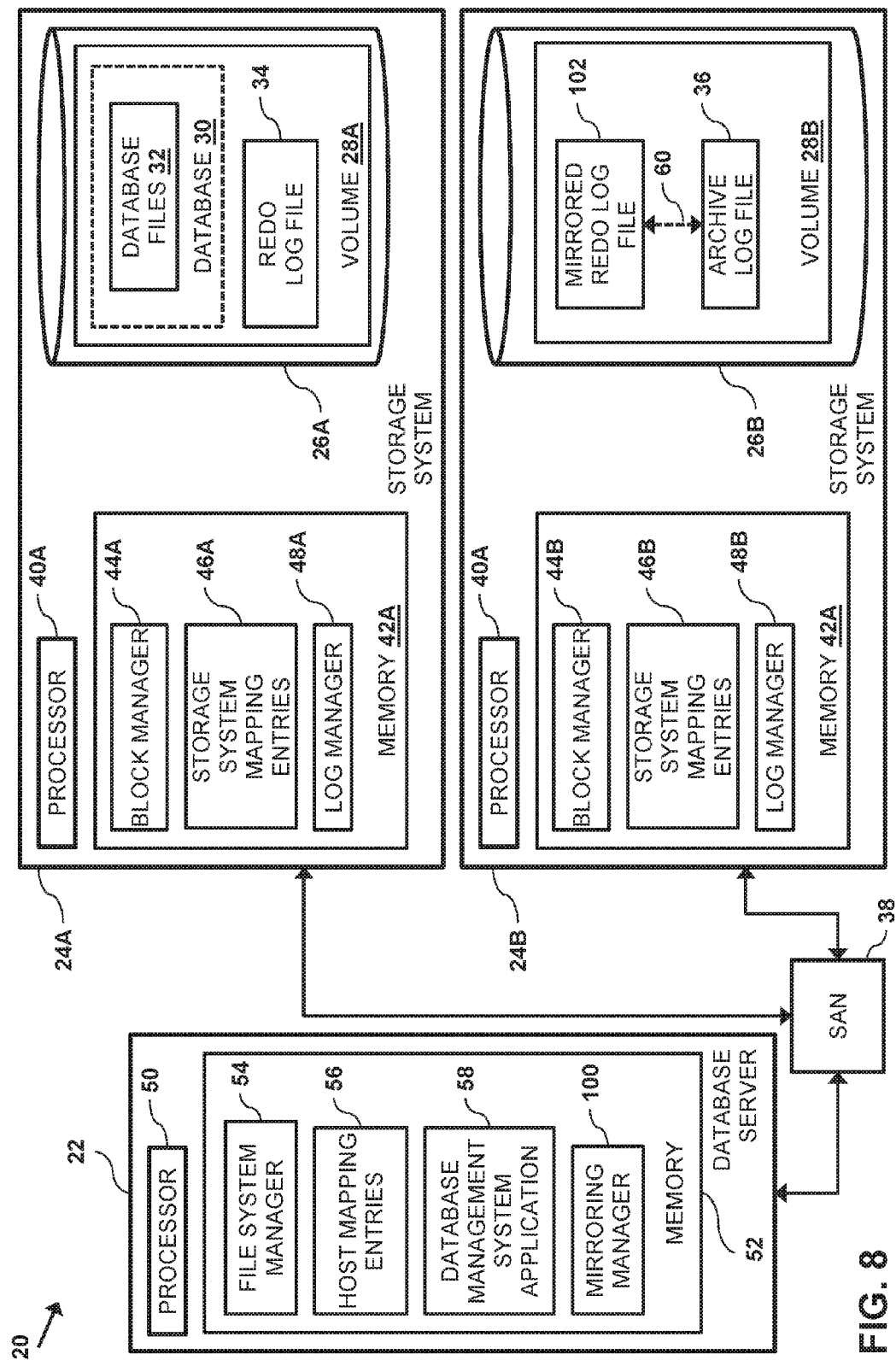
FIG. 8 is a block diagram that schematically illustrates a storage facility comprising the database management system and configured to perform fast archive operations by mapping data stored in the redo log to the archive log file, in accordance with a second embodiment of the present invention.

FIG. 8 is a block diagram that schematically illustrates storage facility 20, in accordance with a second embodiment of the present invention. In the second embodiment presented in FIG. 8, redo log files 34 are stored on storage device 26A, and archive log files 36 are stored on storage device 26B. In other words, in the example shown in FIG. 8, the redo and the archive log files are stored to different storage systems 24.

In the configuration shown in FIG. 8, processor 50 executes, from memory 42, a mirroring manager 100 that respectively mirrors redo log files 34 on storage system 24A to mirrored redo log files 102 on storage system 24B. An example of mirroring manager 100 comprises Oracle's multiplexing function. In the second embodiment, log manager 48 creates a given archive log file 36 by remapping the file blocks in a given mirrored redo log file 102 to the given archive log file.

In one embodiment, log manager 48 can remap redo log file 34 to archive log file 36 by changing storage system file name 90 in the storage system mapping entry for the redo log file, thereby renaming (i.e., in the storage system) the redo log file to a new archive log file. In a second embodiment, log manager 48 can rename the redo log file by creating a new storage system mapping entry 46, storing an archive log file name to storage system file name 90 in the new storage system mapping entry, copying volume name 92 and mapping pairs 94 from the storage system mapping entry for the redo log file to the new storage system mapping entry, and deleting the original storage system mapping entry (i.e., for the log file). These same embodiments can be used to remap mirrored redo log file 102 to archive log file 36.

To initially map (i.e., define) redo log file 34, file system manager 54 allocates a set of volume blocks 70 that correspond to a set of storage blocks 87 on a given storage device 26 having respective physical locations, maps the set of the volume blocks to a set of file blocks 72, and stores the mappings to a given host mapping entry 56. When remapping the set of the volume blocks to archive log file 36, the storage system mapping entry for the archive file references the same set of the storage blocks. Therefore, in embodiments of the present invention, block manager 48 performs remapping operations without moving or copying the transactions stored in redo log file 34.

While the configurations in FIGS. 1 and 8 show storage systems 24 configured as block-based storage systems that communicate over SAN 38, configuring the storage systems as any type of storage system that provides file-level services is considered to be within the spirit and scope of the present invention. For example, storage systems 24 may be configured as network attached storage (NAS) systems, and processor 50 may execute, from memory 42, a NAS client (or any other type of file-level client) that is configured to communicate with a NAS manager (or any other type of file-level manager) executing on a given storage system 24 in order to map, to database server 22, the files stored on the storage system. In this configuration the NAS manager can be configured to remap redo log file 34 to archive log file 36 by renaming the redo log file to the archive log file. In this case, the file maps (i.e., mapping entries 56) are created and maintained by the NAS manager as opposed to the previous embodiment where the original redo file maps are created and maintained by the database server and communicated to the storage server via the map CLI.

Additionally, while the configurations in FIGS. 1 and 8 show storage facility 20 comprising a database server 22 and two storage systems 24 comprising processors 40, memories 42 and storage devices 26, other hardware and/or software configurations of the storage facility and the storage systems that can implement embodiments of the present invention are considered to be within the spirit and scope of the present invention.

Figure 9:
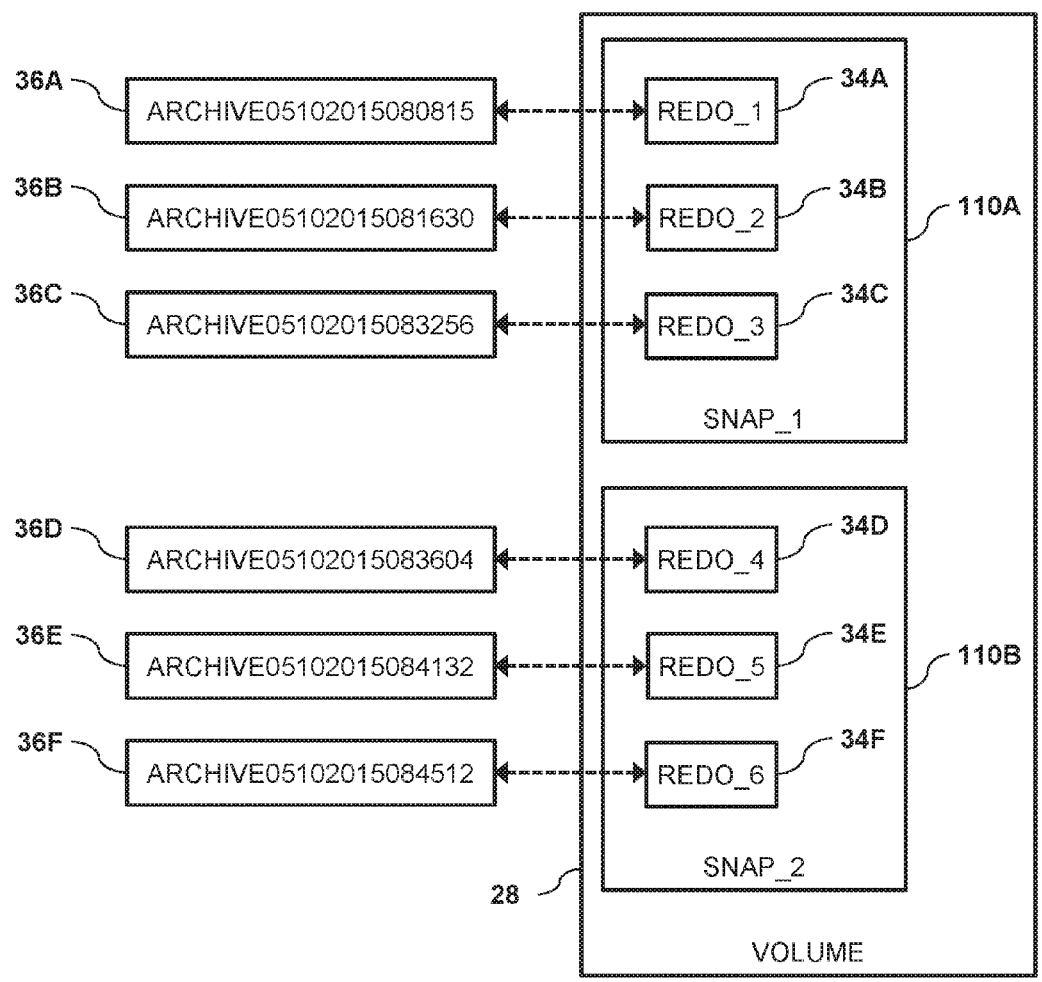
FIG. 9 is a block diagram that schematically illustrates using snapshots of redo log files to create archive log files, in accordance with a third embodiment of the present invention.

FIG. 9 is a block diagram that schematically illustrates volume 28 configured to use snapshots 110 to seamlessly remap a given redo log file 34 to a given archive log file 36, in accordance with a third embodiment of the present invention. In the third embodiment, the redo log files and the archive log files are stored on volume 28B. In other words, in the third embodiment, the redo and the archive log files are stored to the same volume 28 on the same storage system 24 (as in the first embodiment described supra in the description referencing FIG. 1). In FIG. 9, snapshots 110, redo log files 34 and archive log files 36 are differentiated by appending a letter to the identifying numeral, so that the snapshots comprise snapshots 110A and 110B, the redo log files comprise redo log files 34A-34F and the archive log files comprise archive log files 36A-36F.

In some embodiments, storage systems 24 support redirect-on-write snapshot technology via a snapshot mechanism (not shown) that can be invoked by the log manager 48. In redirect-on-write snapshots, once a given snapshot is taken, new writes are redirected to a snapshot reserve volume rather than copying data from volume 28.

To use snapshots 110 to create the archive log files, the snapshot mechanism maintains previous versions of the redo log file by using them as archive log files 36. In this embodiment, log manager 48 only needs to know the mapping of the first volume block 70 block of the first (i.e., least recent) redo log file 34. While processing a sequence of consecutive writes, if a first write operation to this first volume block is detected, log manager 48 generates a new snapshot 110 of volume 28 before writing the data to this block, thereby guarantying that the past version of the redo log files is not overwritten.

Log manager 48 can delete a set of archive log files 36 (depending on the number of redo log files 34 in the database) by deleting the snapshot storing the set of the archive log files. Since a single snapshot 110 stores multiple archive log files 36, it is typically not possible for log manager 48 to delete an individual archive log file 36. Log manager 48 can extract a given archive log file 34 by mounting the appropriate snapshot 110 and reading the corresponding redo log file 34.

In operation, log manager 48 can use the table shown blow to manage archive log files 36. In this table, each archive log file 36 is represented by a given row that comprises the archive log file's name, an identity of a given snapshot 110 on which it resides, and the corresponding redo log file name on that snapshot. Therefore, in the third embodiment, log manager can remap redo log file 34 to archive log file 36 by generating a snapshot of the volume storing the redo log files which can then be accessed as archive log files.

| data_base_name | | |
|---|---|---|
| file_name | Snapshot# | redo file name |
| Archive05102015080815 | Snap_1 | Redo_1 |
| Archive05102015081630 | Snap_1 | Redo_2 |
| Archive05102015083256 | Snap_1 | Redo_3 |
| Archive05102015083604 | Snap_2 | Redo_1 |
| Archive05102015084132 | Snap_2 | Redo_2 |
| Archive05102015084512 | Snap_2 | Redo_3 |

Processors 40 and 50 typically comprise general-purpose central processing units (CPU), which are programmed in software to carry out the functions described herein. The software may be downloaded to database server 22, and storage systems 24 in electronic form, over a network, for example, or it may be provided on non-transitory tangible media, such as optical, magnetic or electronic memory media. Alternatively, some or all of the functions of processors 40 and 50 may be carried out by dedicated or programmable digital hardware components, or using a combination of hardware and software elements. Examples of memory 42 and memory 52 include dynamic random-access memory (DRAM) and non-volatile random-access memory (NVRAM).

REDO LOG FILE REMAPPING

Figure 10:
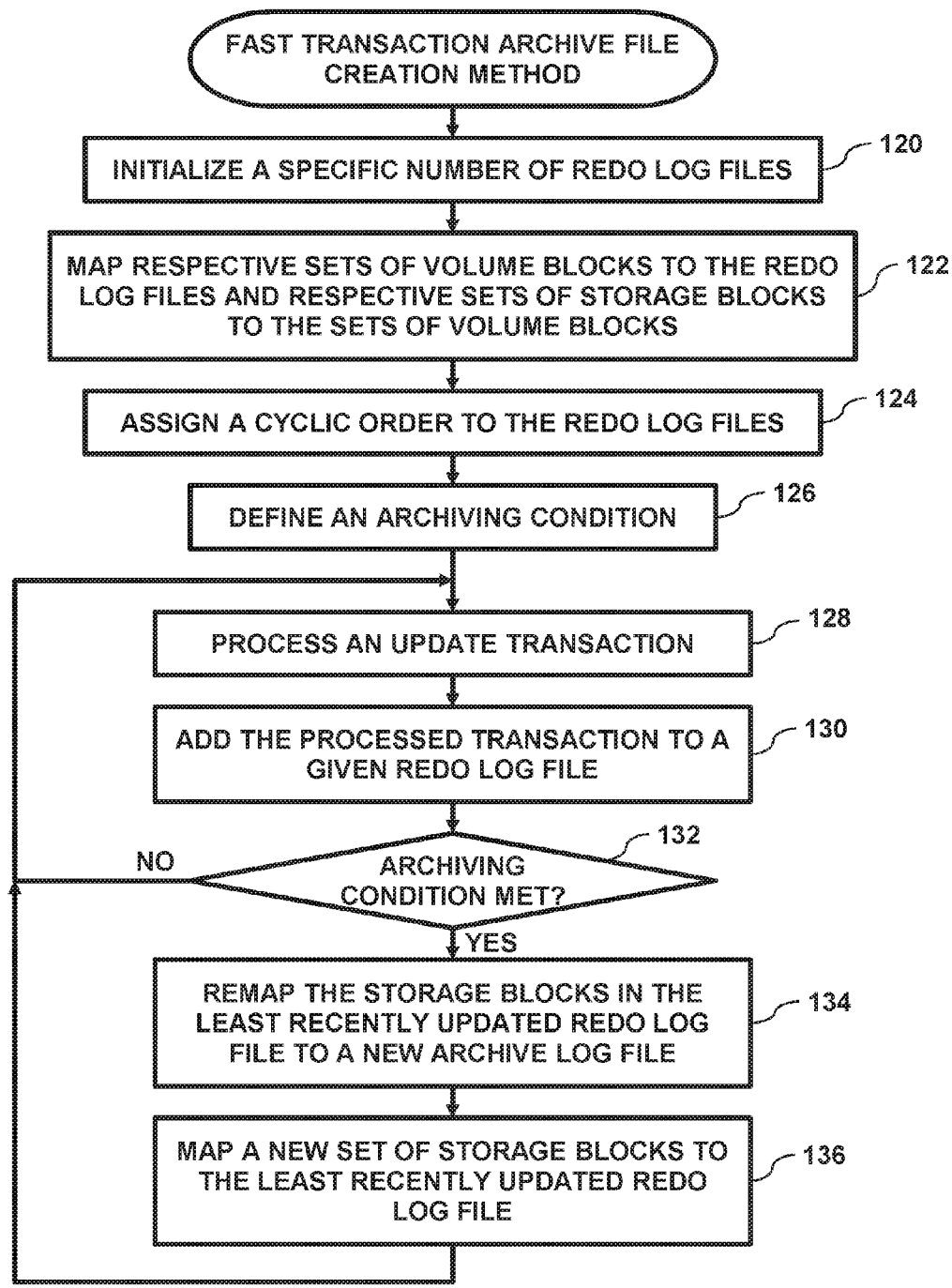
FIG. 10 is a flow diagram that schematically illustrates a method of fast archive log file creation, in accordance with an embodiment of the present invention.

FIG. 10 is a flow diagram that schematically illustrates a method of quickly creating a given archive log file 34, in accordance with an embodiment of the present invention. In an initialization step 120, processor 50 initializes a specific number (e.g., three) redo log files 34, and in a first mapping step 122, the database processor maps respective sets of volume blocks 70 to the redo log files, and processor 40 maps respective sets of storage blocks 87 to the sets of the volume blocks.

In an assignment step 124, processor 50 assigns a cyclic order to redo log files 34. For example, if processor 50 initialized (i.e., in step 120) a first redo log file 34, a second redo log file 34 and a third redo log file 34, the database processor can define the cyclic order as the first redo log file followed by the second redo log file followed by the third redo log file followed by the first redo log file . . . .

In a definition step 126, processor 50 defines an archiving condition. The archiving condition may comprise a specific time interval (e.g., 30 minutes), storing a specific number of transactions to redo log file 34, the redo log file utilizing a specific amount of storage space, or overwriting a given redo log file 34 (i.e., due to the cyclical configuration the database processor can detect that a given redo log file 34 is about to be overwritten). Examples of performing the initialization step include retrieving the maximum number of redo log files 34 and the archiving condition from a configuration file (not shown) or receiving an input from a user (e.g., a database administrator).

Database management system application 58 processes a database update transaction in a processing step 128, and adds the database update transaction to a given redo log file 34 in an addition step 130. To add the database update transaction to the given redo log file, database management system application conveys a copy of the database update transaction to the given redo log file on a given storage system 24.

In a comparison step 132, if processor 50 detects that the archiving condition has been met (e.g., 30 minutes since the last archive operation or a given redo log file 34 is to be overwritten), then in a remapping step 134, processor 50 conveys a message to log manager 48 to remap the least recently updated redo log file 34 to a given archive log file 36. Upon receiving the message, log manager 48 uses embodiments described hereinabove to remap the set of storage blocks 87 in the least recently updated redo log file to the given archive log file, and to map a new set of storage blocks 87 to the least recently updated redo log file. In an alternative embodiment, processor 50 can perform the remapping by instructing file system manager 54 to rename (i.e., on storage device 26) redo log file 34 to archive log file 36, and to create a new redo log file 34.

Finally, in a second mapping step 136, processor 50 maps a new set of storage blocks 87 to the least recently updated redo log file, and the method continues with step 128. Returning to step 132, if the archiving condition has not been met, then the method continues with step 128.

While the steps in the flow diagram describe a method for storage system 24 (i.e., using log manager 48) to remap redo log file 32 to archive log file 34, configuring the storage system to archive any other type of file 32 is considered to be within the spirit and scope of the present invention. For example, a given storage system 24 can use embodiments described herein to implement a versioning file system that maintains multiple versions of word processing documents that are updated over a period of time.

In operation, processor 50 can initially receive, from a host computer such as database server 22, a given host mapping entry 56 (or the data in the given host mapping entry) for a given file 32 comprising a set of file blocks 72, and upon receiving the given host mapping entry, log manager 48 can create a first storage system mapping entry 46 that defines a mapping between the set of file blocks and a first set of storage blocks 87. As described supra, log manager 48 can define the mapping between a the set of file blocks and the first set of storage blocks 87 by defining a mapping between the set of volume blocks in the given host mapping entry and the first set of file blocks.

Subsequent the mapping between a the set of file blocks and the first set of storage blocks 87 is defined, processor 40 can use embodiments described supra to remap the set of file blocks to a second set of storage blocks, wherein the set of first storage blocks and the set of second storage blocks are mutually exclusive. Upon remapping the file blocks, processor 40 can remap the first set of storage blocks to an archive file (i.e., a prior version of the file), which can be accessed using embodiments described hereinabove. In embodiments of the present invention, the given file 32 comprises a given set of storage blocks 87 referenced by a given storage system mapping entry 46.

Subsequent to performing the remapping, if processor 40 receives, from a host computer (e.g., database server 22), a request to retrieve data from the given file, the storage processor can locate the storage system mapping entry for the given file (i.e., the storage system mapping entry that references the first set of storage blocks 87), retrieve the requested data from the second set of storage blocks, and convey the retrieved data to the host computer.

Prior to performing the remapping, if processor 40 receives a request to write data to a given file block 72 (i.e., a given volume block 70), the storage processor can store the data to a given storage block 87 in the first set that is currently mapped to the given file block. Subsequent to performing the remapping, if processor 40 receives a request to write data to the given file block, the storage processor can store the data to a given storage block 87 in the second set that is currently mapped to the given file block.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for generating an archive file for data generated by a software application configured to access an application file, comprising:
    mapping, by a storage system comprising one or more storage devices, a first set of storage blocks on one or more storage devices to an application file;
    receiving, by the storage system at a first time from a software application, a request to store first data to the application file;
    storing, to the first set of storage blocks mapped to the application file, the first data received from the software application;
    receiving, by the storage system at a second time subsequent to the first time, an indication that a specified archiving condition has been met;
    in response to receiving the indication that the specified archiving condition has been met:
        remapping the first set of storage blocks to an archive file, thereby removing the mapping of the first set of storage blocks to the application file, and
        mapping a second set of storage blocks on the one or more storage devices to the application file, wherein the first and the second sets of storage blocks are mutually exclusive;
    receiving, from the software application at a third time subsequent to the second time, a request to store second data to the application file; and
    storing, to the second set of storage blocks mapped to the application file, the second data received from the software application.

2. The method according to claim 1, wherein the storage system comprises a block-level storage system.

3. The method according to claim 2, wherein the application file has a first file name, wherein remapping the first set of storage blocks comprises assigning, by a host computer coupled to the block-level storage system, a second file name to the first set of storage blocks, and wherein mapping the second set of storage blocks comprises assigning, by the host computer, the first file name to the second set of storage blocks.

4. The method according to claim 1, wherein the storage system comprises a file-level storage system, wherein the application file has a first file name, and wherein remapping the first set of storage blocks comprises assigning, by the file-level storage system, a second file name to the first set of storage blocks.

5. The method according to claim 1, wherein the application file comprises a set of file blocks, and wherein mapping a given set of storage blocks to the application file comprises mapping the set of file blocks to the given set of storage blocks.

6. The method according to claim 1, wherein the software application comprises a transaction processing system, wherein the application file comprises a redo log file for the transaction processing system, wherein the first and the second data comprise transactions for the transaction processing system.

7. The method according to claim 1, and comprising detecting that the archiving condition is met by detecting one or more of: a specific time interval, a specific number of transactions in the application file, overwriting the application file, and a specific amount of storage space used by the application file.

8. The method according to claim 1, wherein the storage system comprises a first storage system, and comprising mirroring the application file to an additional set of storage blocks on a second storage system, and wherein remapping the first set of storage blocks to the archive file comprises remapping the additional set of the storage blocks to the archive file.

9. The method according to claim 1, wherein the given storage device comprises a logical volume storing the first set of storage blocks, and wherein remapping the first set of storage blocks to the archive file comprises generating a snapshot of the logical volume.

10. The method according to claim 9, wherein the snapshot comprises a redirect-on-write snapshot.

11. The method according to claim 6, wherein the transaction processing system comprises a database management system.

12. A storage system, comprising:
one or more storage devices, each of the storage devices comprising a plurality of storage blocks; and
a storage processor configured:
to map a first set of the storage blocks on one or more of the storage devices to an application file,
to receive, at a first time from a software application, a request to store first data to the application file,
to store, to the first set of storage blocks mapped to the application file, the first data received from the software application,
to receive, at a second time subsequent to the first time, an indication that a specified archiving condition has been met,
in response to receiving the indication that the specified archiving condition has been met:
to remap the first set of storage blocks to an archive file, thereby removing the mapping of the first set of storage blocks to the application file, and
to map a second set of storage blocks on the one or more storage devices to the application file, wherein the first and the second sets of storage blocks are mutually exclusive,
to receive, from the software application at a third time subsequent to the second time, a request to store second data to the application file, and
to store, to the second set of storage blocks mapped to the application file, the second data received from the software application.

13. The storage system according to claim 12, wherein the storage processor is configured to execute a block manager that is configured to map a logical volume to a given storage device.

14. The storage system according to claim 13, wherein the application file has a first file name, and wherein the storage processor is configured to remap the first set of storage blocks by assigning, by a host computer coupled to the block-level storage system, a second file name to the first set of storage blocks, and wherein mapping the second set of storage blocks comprises assigning, by the host computer, the first file name to the second set of storage blocks.

15. The storage system according to claim 12, wherein the storage processor is configured to execute a file-level manager, wherein the application file has a first file name, and wherein the file-level manager is configured to remap the first set of storage blocks by assigning a second file name to the first set of storage blocks.

16. The storage system according to claim 12, wherein the application file comprises a set of file blocks, and wherein the storage processor is configured to map a given set of storage blocks to the redo log file by mapping the given set of storage blocks to the set of file blocks.

17. The storage system according to claim 12, wherein the software application comprises a transaction processing system, wherein the application file comprises a redo log file for the transaction processing system, wherein the first and the second data comprise transactions for the transaction processing system.

18. The storage system according to claim 12, and comprising detecting that the archiving condition is met by detecting one or more of: a specific time interval, a specific number of transactions in the application file, overwriting the application file, and a specific amount of storage space used by the application file.

19. The storage system according to claim 12, wherein the storage system comprises a first storage system, wherein the storage processor comprises a first storage processor, and wherein the first storage processor is configured to mirror the application file to an additional set of the storage blocks on a second storage system comprising a second storage processor, and wherein the second storage processor is configured to remap the first set of the storage blocks to the archive file by remapping the additional set of the storage blocks to the archive file.

20. The storage system according to claim 12, wherein the given storage device comprises a logical volume storing the first set of storage blocks, and wherein the storage processor is further configured to remap the first set of storage blocks to the archive file by generating a snapshot of the volume.

21. The storage system according to claim 20, wherein the snapshot comprises a redirect-on-write snapshot.

22. The storage system according to claim 17, wherein the transaction processing system comprises a database management system.

23. A computer software product, the product comprising a non-transitory computer-readable medium, in which program instructions are stored, which instructions, when read by a computer, cause the computer:
to map, by a storage system comprising one or more storage devices, a first set of storage blocks on one or more storage devices to an application file,
receiving, by the storage system at a first time from a software application, a request to store first data to the application file,
storing, to the first set of storage blocks mapped to the application file, the first data received from the software application,
receiving, by the storage system at a second time subsequent to the first time, an indication that a specified archiving condition has been met,
in response to receiving the indication that the specified archiving condition has been met:
to remap, the first set of storage blocks to an archive file, thereby removing the mapping of the first set of storage blocks to the application file, and
to map a second set of storage blocks on the one or more storage devices to the application file, wherein the first and the second sets of storage blocks are mutually exclusive,
to receive, from the software application at a third time subsequent to the second time, a request to store second data to the application file, and
to store, to the second set of storage blocks mapped to the application file, the second data received from the software application.

* * * * *